April 15, 1952     L. R. BUCKENDALE     2,592,536
COMPENSATING BRAKE CAM FOLLOWER
Filed Aug. 7, 1947     3 Sheets-Sheet 1
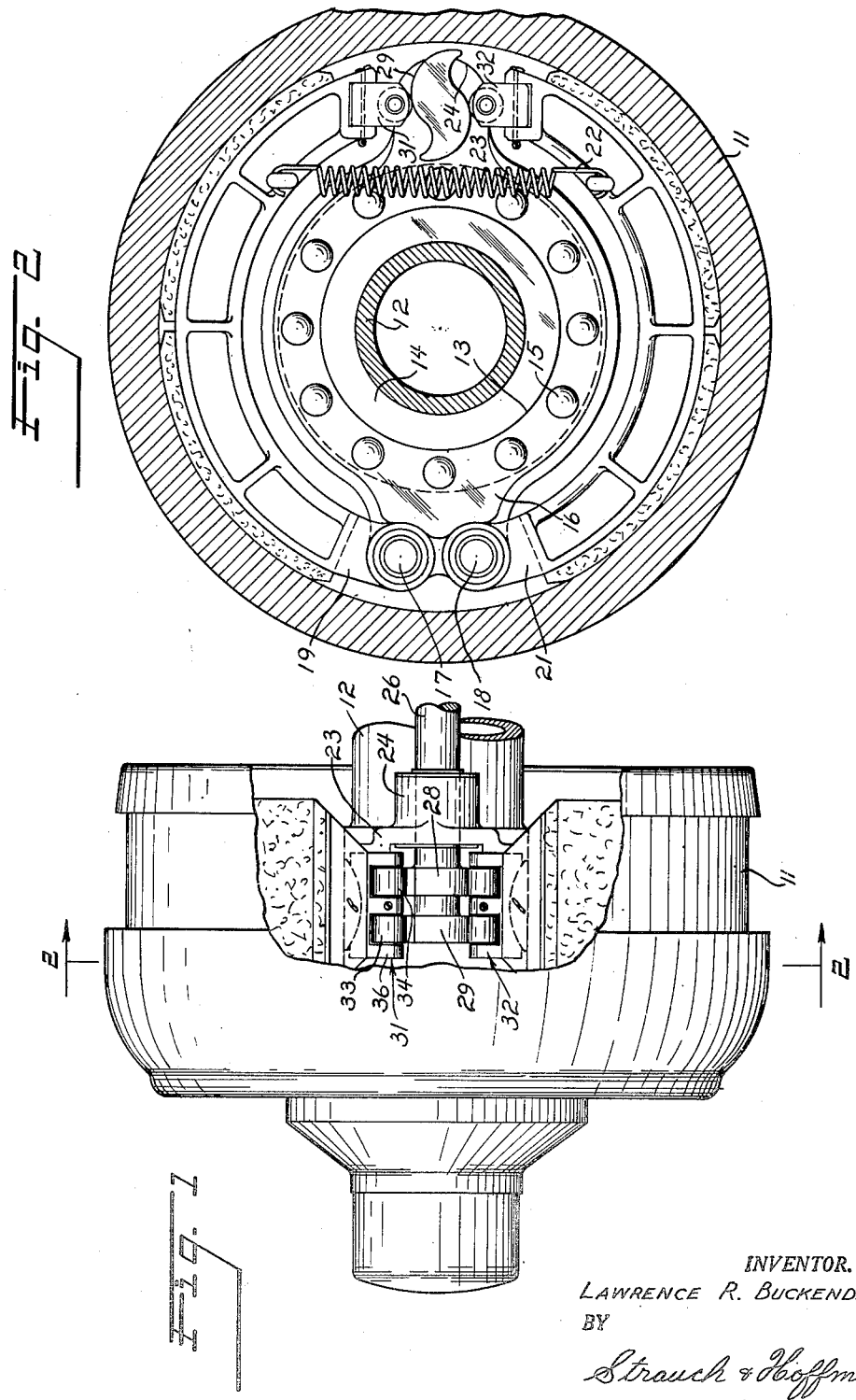
INVENTOR.
LAWRENCE R. BUCKENDALE
BY
*Strauch & Hoffman*
ATTORNEYS

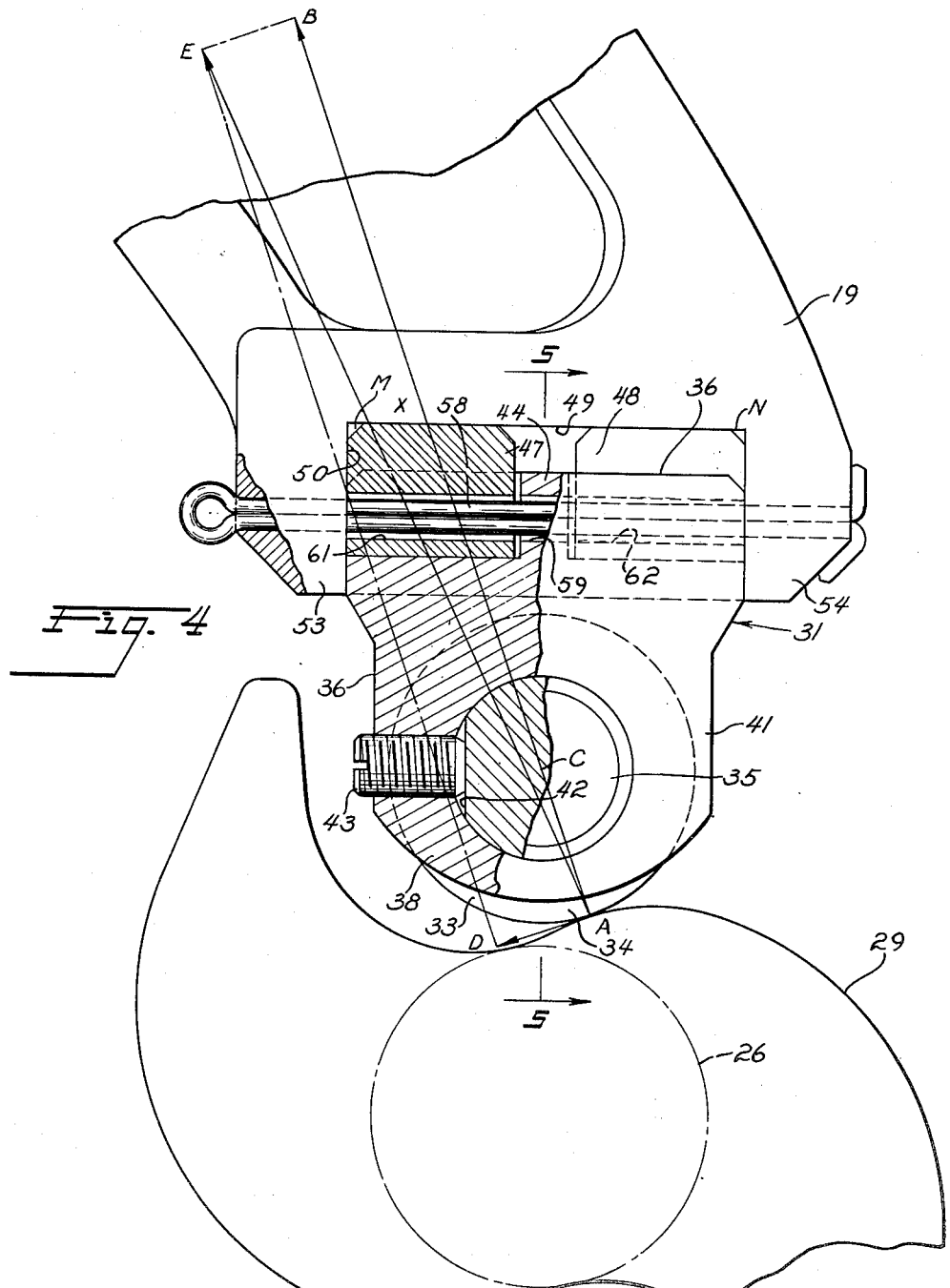

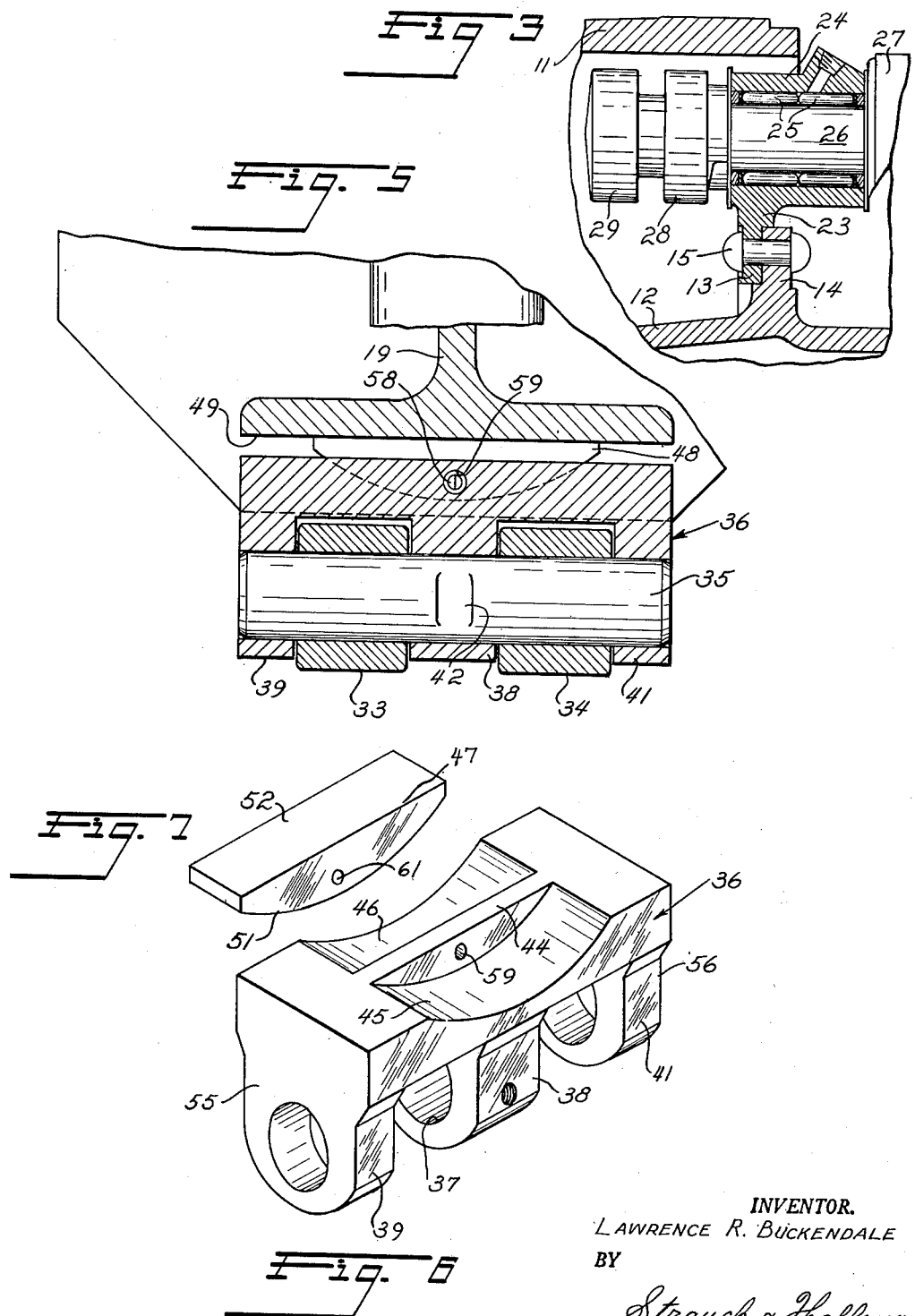

Patented Apr. 15, 1952

2,592,536

UNITED STATES PATENT OFFICE 2,592,536

COMPENSATING BRAKE CAM FOLLOWER

Lawrence R. Buckendale, Detroit, Mich., assignor to The Timken-Detroit Axle Company, Detroit, Mich., a corporation of Ohio Application August 7, 1947, Serial No. 767,217

10 Claims. (Cl. 188—78)

1

This invention relates generally to vehicle brakes and more specifically to cam actuated, internally expanding brakes having compensating cam followers on the brake shoes.

A number of serious disadvantages have been encountered in cam and follower constructions in heavy duty vehicle brakes due to the fact that only a line of contact is maintained between the cam surface and the surface of the cam follower which is usually a roller. The heavy pressures necessarily exerted on the contacting cam and cam follower surfaces during the actuation of heavy duty brakes require an adequately long line of contact to prevent distortion of the contacting surfaces. With a roller type cam follower, experience has established that insufficient line of contact will not only distort the outside surface of the roller but will carry through the roller to its inner bore, causing it to seize the pivot on which it is journalled. Also of importance is that heavy torque loads on the cam head tend to shorten its line of contact with the cam follower due to the fact that the cam head usually overhangs its support.

When using the roller type cam follower in heavy duty brakes it has been found necessary to provide a roller of greater length as the required torque loads on the cam are increased. However, since heavy torque loads tend to destroy parallelism between the cam head and the roller axes, as the length of the roller is increased even slight angular misalignment between the axes of the roller and the cam tends to materially shorten their line of contact thereby impairing the intended effectiveness of the longer roller.

It is therefore the primary object of this invention to provide a cam actuated brake mechanism having brake shoes provided with novel cam follower mechanism adapted to compensate for misalignments between the contacting surfaces of the follower and the cam head to maintain the necessary line of contact between the cam and follower.

Another object of this invention is to provide a cam actuated brake shoe having a cam follower comprising a roller unit carried by a member rockably mounted on the brake shoe.

It is an object of the invention to provide a novel compensating mount for a brake cam follower roller unit wherein the unit is mounted for rocking on the brake shoe end about an axis substantially perpendicular to the roller axis.

A still further object of this invention is to provide a brake shoe cam follower comprising a bearing member and a roller carrier rockably

2 mounted on bearing surfaces of the bearing member with the resultant of the braking forces acting on the cam follower passing through the bearing surfaces.

Another object of this invention is to provide a cam actuated brake shoe having an arcuate bearing surface and a cam follower unit mounted for rocking movement on the bearing surface.

A further object of this invention is to provide a cam actuated brake shoe having a cam follower comprising a bearing member and a roller carrier, the bearing member being provided with a planar surface in slidable contact with the brake shoe and arcuate surface in contact with the roller carrier.

These and other objects will be apparent as the specification proceeds in connection with the annexed drawings wherein:

Figure 1 is a top plan view of a wheel hub and a brake drum broken away to show the dual cam and follower roller structure according to a preferred embodiment of the invention;

Figure 2 is a section substantially along line 2—2 of Figure 1 further illustrating the expanding brake shoes provided with the cam follower units of this invention;

Figure 3 is a fragmentary enlarged view partly in section illustrating the dual cam actuator for the brake shoes;

Figure 4 is an enlarged fragmentary view partly broken away and in section of the rockable cam follower unit at one end of a brake shoe;

Figure 5 is a section taken substantially along line 5—5 of Figure 4;

Figure 6 is a perspective view illustrating the details of the roller carrier; and Figure 7 is a perspective view of one of the bearing blocks interposed between the roller carrier and the brake shoe.

The specification continues with reference to the drawings wherein like numerals designate like parts throughout.

A brake drum 11 comprising part of a conventional vehicle wheel assembly is mounted on axle housing 12. A brake spider 13 is secured rigidly to radial axle flange 14 as by rivets 15. Spider 13 is formed with a radial projection 16 on which are secured parallel cylindrical pins 17 and 18 for pivotally mounting a pair of brake shoes 19 and 21 at adjacent extremities.

Brake shoes 19 and 21 are of the usual type which may be simultaneously rocked outwardly toward the inner surface of drum 11 for bringing the friction lining elements into contact with the inner drum surface to effect a braking action.

The brake shoes are normally retracted out of contact with the drum by means of a return tension spring 22 secured between the shoes. Actuation of the brake shoes toward the inner drum surface is effected by rotation of a dual cam assembly disposed between the free ends of the brake shoes as will be described.

Substantially diametrically opposite the projection 16 for mounting the brake shoe pivots is a similar radial projection 23 formed with an integral hollow boss 24 lined with needle roller bearings 25 journalling a cam shaft 26 that is rotated by a suitable power element (not shown) such as a pneumatic motor through a crank 27 secured to shaft 26.

Cam shaft 26 projects from boss 24 into the interior of drum 11 and carries two spaced cams 28 and 29 that are rigid and preferably integral with shaft 26. Cams 28 and 29 are of the usual contour as illustrated in Figures 2 and 4 and are adapted to coact with suitable roller followers on the ends of the brake shoes as will appear. Cams 28 and 29 are identical and bear the same angular relation to shaft 26.

The free ends of the brake shoes carry identical cam follower units designated in Figures 1 and 2 at 31 and 32, and the opposite sides of cams 28 and 29 are engaged by similarly spaced cylindrical rollers on these units. Referring to Figures 4 and 5, which illustrate follower unit 31 in detail, rollers 33 and 34 are freely rotatably mounted on a cross shaft 35 that is fixed on a carrier 36 illustrated best in Figure 6. Shaft 35 extends through a bore 37 in a central lug 38 and at its opposite ends projects into bores in lugs 39 and 41. Rollers 33 and 34 are mounted between the lugs and are thus prevented from shifting axially. Shaft 35 is formed with a flat seat 42 adapted to be engaged by a set screw 43 threaded in lug 38, so that shaft 35 is non-rotatably mounted on carrier 31 but is readily removable for repair or replacement. By this dual roller construction the radial loads on the rollers place shaft 35 in shear in four substantially equidistant places, thereby increasing the resistance of shaft 35 to bending and permitting the use of a much smaller diameter shaft than would be possible in the case of the hitherto used single long roller which would place the shaft in shear in but two places.

As illustrated in Figure 6, carrier 36 is formed with a central web 44 between two arcuate bearing recesses of the same size facing toward the end of brake shoe 19 and open at the outer sides. The arcuate bottom or bearing surfaces 45 and 46 of the recesses are preferably of cylindrical contour with their common axis substantially perpendicular to the axis of rotation of rollers 33 and 34.

Two identical rocker members 47 and 48 are interposed between carrier 36 and a planar surface 49 at the bottom of a square cornered recess 50 in the end of brake shoe 19 and each member has an arcuate bearing surface 51 of the same curvature as and in full area rocking engagement with the recessed arcuate bearing surfaces of the carrier. Each member is provided with a flat surface 52 in slidable contact with the flat end surface 49 on the brake shoe.

As illustrated best in Figure 4, arms 53 and 54 on the brake shoe at opposite ends of recess 50 closely and slidably embrace the flat side walls 55 and 56 of carrier 36. A suitable fastening element, such as cotter pin 58, is supported in arms 53 and 54 and passes freely through an enlarged bore 59 in web 44 and through similar enlarged bores 61 and 62 in the respective rocker members, to retain the carrier and the rocker members in assembled relationship with the brake shoe. The enlarged bores 59, 61 and 62 permit the carrier to freely rock on members 47 and 48 to thereby always maintain parallelism between the axes of the rollers and the cams and insure maximum line contact between the cam and associated rollers, while the members 47 and 48 may slide on brake shoe bearing surface 49 in a transverse direction to automatically center the carrier with the cams.

I have thus provided a compensating mount for the rollers enabling the rollers on both shoes to maintain parallelism and full surface engagement with the cams so that the brake shoe expending forces will be exerted radially of the rollers.

The cam follower unit 32 which engages the cams 28 and 29 opposite unit 31 is identical and is similarly rockably and slidably mounted on the end of brake shoe 21 to maintain the rollers parallel and in alignment with the cam surfaces.

Referring to Figure 4, the theoretical desired direction of the brake shoe actuating force, indicated by line AB, exerted on each roller by its associated cam starts at the line of contact A of the cam and roller, passes through the center C of the roller, and intersects the area of contact of the bearing surfaces of the carrier and rocker members. Because of friction between the cam and roller, a tangential component AD of this force acts on the roller at substantially right angles to direction AB tending to tilt the carrier with respect to shoe 19. This force is resisted by arms 53 and 54 of the shoe.

The resultant AE of the theoretical force direction AB and tangential component AD by reason of the above described dual roller construction which makes the frictional component small in magnitude also intersects the area of contact of the bearing surfaces of the carrier and rocker members. The resultant force direction AE passes preferably between the points M and N defining the limits of contact of the rocker members and shoe surface 49.

The degree of force AD with respect to force AB is small when due to friction only although wear and cramped bearings for the rollers would tend to increase it and throw resultant AE to the left of point M in Figure 4 and thus increase the tendency to tilt the carrier. My novel construction wherein friction is minimized and the wear forces are so distributed as to prevent cramping of the roller journals maintains the component AD low during the life of the brake.

As a result of this construction and direction and control of forces, the force components tending to rock each carrier with respect to its associated brake shoe and in the direction of the above mentioned friction component are minimized, which considerably reduces wear and increases life of the assembly.

Although the cam follower units of the preferred embodiment of this invention are provided with rollers, it will be understood that each carrier 36 may be formed with stationary arcuate follower surfaces in place of rollers 33 and 34 without changing the principles of operation. The rollers of the preferred embodiment serve to decrease the friction between the cam and the carrier and thereby serve to minimize the magnitude of tangential force AD, which might be slightly larger with non-rotating follower surfaces.

Tests have satisfactorily been made using a steel cam having a uniform displacement of .046 inch per 5° of rotation and acting against a steel roller member journalled on a steel shaft on the brake shoe. The cam and roller were so arranged that the angle X between the theoretical force direction AB and bearing surface 49 on the brake shoe was never less than 71°. The perpendicular distance from the bearing surface 49 to the roller center C was 1⅜ inches and the distance MN was 1½ inches. The center C of the roller was so located as to make the distance CM equal to distance CN.

From the foregoing, it is clearly evident that the cam follower unit of this invention may automatically shift the axis of its rollers to always remain parallel to the cam surfaces and thereby compensate for manufacturing misalignments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a brake mechanism, a pivotally mounted cam operated brake shoe movable in a certain path and a transversely rockable and slidable cam follower unit mounted on said brake shoe, the axis of rocking of said unit being substantially perpendicular to the pivot axis of said shoe.

2. A brake mechanism comprising a cam actuated brake shoe member pivoted for movement in a certain path, a cam follower member rockably mounted on said brake shoe upon an axis substantially perpendicular to the pivot axis of said shoe, and arms on one of said members embracing the other of said members for preventing tilt of cam follower member transversely of the direction of rocking of said cam follower member.

3. In a brake assembly, a pivoted brake shoe, a cam roller on said shoe rotatable about an axis substantially parallel to the shoe pivot axis, and a carrier for said roller rockably and slidably mounted on said shoe, said carrier being rockable about an axis substantially normal to the pivot axis of said brake shoe and slidable substantially parallel to the pivot axis of said brake shoe.

4. In a brake, a brake shoe recessed at one end and having a pivot mount at the other end, a carrier rockably and slidably mounted in said recess, said carrier being rockable about an axis substantially normal to the axis of said pivot and being slidable substantially parallel to the axis of said pivot, and a cam follower roller rotatably mounted on said carrier upon an axis substantially parallel to said pivot axis.

5. In a brake, a brake shoe having a planar surface, a cam follower carrier on said shoe formed with recesses having arcuate surfaces facing said planar surface and spaced by a web, and rocker members in each of said recesses providing a sliding and rocking connection between said carrier and said shoe.

6. In the brake defined in claim 5, a plurality of spaced lugs projecting from said carrier away from the shoe, a cross shaft projecting through aligned bores in said lugs, and cam follower rollers on said shaft between said lugs.

7. In the brake defined in claim 5, arms on said brake shoe embracing said carrier to prevent tilt of the carrier transversely of its direction of rocking, and a fastening element projecting through aligned bores in said arms, said web and said rocker members, said bores in the web and rocker members being larger than the fastening element to permit movement of the carrier on the shoe.

8. A carrier for a brake assembly comprising a member formed on one side with arcuate bearing surface recesses spaced by a web, and a plurality of spaced cam follower roller shaft supporting lugs projecting from the other side.

9. In a brake assembly, a pivoted brake shoe, a cam roller on said shoe rotatable about an axis substantially parallel to the shoe pivot axis, and a carrier for said roller rockably and slidably mounted on said shoe, said carrier having an arcuate bearing surface facing a planar bearing surface on said shoe and a rocker member having surfaces in full area engagement with said surfaces interposed between said carrier and said shoe.

10. In a brake assembly, a pair of brake levers pivoted at adjacent ends about parallel axes, a cam disposed between the other ends of said levers and rotatable about an axis parallel to said pivot axes, said cam having opposed curved operating surfaces the transverse elements of which are parallel to the cam axis, a cam follower roller on each lever freely rotatable about an axis parallel to the associated lever pivot, and means rockably and slidably mounting each roller on its associated lever comprising a member mounted on the lever slidable parallel to said lever pivot, a roller carrier rockably mounted on said member for movement about an axis normal to the lever pivot, and a spring interconnecting said levers for urging said rollers into contact with said cam surfaces.

LAWRENCE R. BUCKENDALE.

REFERENCES CITED

The following references are of record in the file of this patent:

UNITED STATES PATENTS

| Number | Name | Date |
|---|---|---|
| 774,496 | Rivett | Nov. 8, 1904 |
| 1,727,923 | Andres | Sept. 10, 1929 |
| 2,002,786 | Melling | May 28, 1935 |
| 2,064,103 | Burdick | Dec. 15, 1936 |
| 2,069,344 | White | Feb. 2, 1937 |
| 2,351,114 | Freeman | June 13, 1944 |